(12) United States Patent
Joshi et al.

(10) Patent No.: US 10,975,749 B2
(45) Date of Patent: Apr. 13, 2021

(54) SYSTEMS AND METHODS FOR HEATING REDUCTANT

(71) Applicant: CUMMINS EMISSION SOLUTIONS INC., Columbus, IN (US)

(72) Inventors: Vinay Kumar Joshi, Pune (IN); Aaditya Barve, Ujjain (IN); Anjesh Hemant Sahasrabudhe, Pune (IN); Timothy M. Doyle, Greenwood, IN (US); Stephen M. Holl, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 132 days.

(21) Appl. No.: 16/179,452

(22) Filed: Nov. 2, 2018

(65) Prior Publication Data

US 2019/0136733 A1   May 9, 2019

Related U.S. Application Data

(60) Provisional application No. 62/582,024, filed on Nov. 6, 2017.

(51) Int. Cl.
*F01N 3/00* (2006.01)
*F01N 3/20* (2006.01)
*F01N 3/22* (2006.01)
*F01N 9/00* (2006.01)

(52) U.S. Cl.
CPC ............. *F01N 3/208* (2013.01); *F01N 3/22* (2013.01); *F01N 9/00* (2013.01); *F01N 2560/06* (2013.01); *F01N 2610/02* (2013.01); *F01N 2610/08* (2013.01); *F01N 2610/10* (2013.01); *F01N 2610/14* (2013.01); *F01N 2610/144* (2013.01); *F01N 2610/1433* (2013.01); *F01N 2900/1602* (2013.01); *F01N 2900/1812* (2013.01); *F01N 2900/1822* (2013.01)

(58) Field of Classification Search
CPC .... F01N 9/00; F01N 3/22; F01N 3/208; F01N 2610/1433; F01N 2900/1812
USPC ........................................................ 60/287
See application file for complete search history.

(56) References Cited

U.S. PATENT DOCUMENTS

8,635,854 B2 *  1/2014  Shovels ................ F01N 3/0253
                                                        60/287
8,661,785 B2 *  3/2014  Levin ..................... F01N 3/208
                                                        60/274
9,127,583 B2 *  9/2015  Hodgson ............... F01N 3/2066
(Continued)

*Primary Examiner* — Jason D Shanske
(74) *Attorney, Agent, or Firm* — Foley & Lardner LLP (57) ABSTRACT

An aftertreatment system includes a reductant source, a junction, a dosing pump module, a valve assembly, and a dosing module. The reductant source stores reductant. The junction receives the reductant from the reductant source. The dosing pump module receives the reductant from the junction and selectively provides the reductant to a first conduit. The valve assembly receives the reductant from the first conduit. The valve assembly is operable between a first state, where the valve assembly provides the reductant to the junction, and a second state, where the valve assembly provides the reductant to a second conduit. The dosing module receives the reductant from the second conduit when provided by the valve assembly. The dosing module is configured to dose exhaust gases with the reductant when provided by the valve assembly.

20 Claims, 4 Drawing Sheets

(56) References Cited

U.S. PATENT DOCUMENTS

| | | | | |
|---|---|---|---|---|
| 2009/0025373 A1* | 1/2009 | Buerglin | ............ | B01D 53/9431 |
| | | | | 60/287 |
| 2009/0301064 A1* | 12/2009 | Maier | ................... | F01N 3/2066 |
| | | | | 60/286 |
| 2010/0095653 A1* | 4/2010 | Thiagarajan | ............ | F01N 3/208 |
| | | | | 60/286 |
| 2010/0218484 A1* | 9/2010 | Arlt | ........................ | F01N 3/208 |
| | | | | 60/274 |
| 2012/0255282 A1* | 10/2012 | Nagata | ................... | F01N 3/208 |
| | | | | 60/274 |
| 2012/0311999 A1* | 12/2012 | Hodgson | ............... | F01N 3/2066 |
| | | | | 60/295 |
| 2013/0055701 A1* | 3/2013 | Yan | ........................ | F01N 3/208 |
| | | | | 60/287 |
| 2016/0061080 A1* | 3/2016 | Tanioka | ................... | F01N 3/24 |
| | | | | 60/274 |

\* cited by examiner

SYSTEMS AND METHODS FOR HEATING REDUCTANT

CROSS-REFERENCE TO RELATED PATENT APPLICATION

This application claims the benefit of and priority to U.S. Provisional Patent Application No. 62/582,024, filed Nov. 6, 2017, the entire disclosure of which is incorporated herein by reference.

TECHNICAL FIELD

The present application relates generally to the field of aftertreatment systems for internal combustion engines.

BACKGROUND

For internal combustion engines, such as diesel engines, nitrogen oxide ($NO_x$) compounds may be emitted in the exhaust. To reduce $NO_x$ emissions, a selective catalytic reduction (SCR) process may be implemented to convert the $NO_x$ compounds into more neutral compounds, such as diatomic nitrogen, water, or carbon dioxide, with the aid of a catalyst and a liquid reductant. The catalyst may be included in a catalyst chamber of an exhaust system, such as that of a vehicle or power generation unit. A liquid reductant, such as anhydrous ammonia, aqueous ammonia, diesel exhaust fluid (DEF), or aqueous urea, is typically introduced into the exhaust gas flow prior to the catalyst chamber.

To introduce the liquid reductant into the exhaust gas flow for the SCR process, an SCR system may dose or otherwise introduce the liquid reductant through a dosing pump that vaporizes or sprays the liquid reductant into an exhaust pipe of the exhaust system up-stream of the catalyst chamber. In some applications, the reductant may be subject to relatively cold temperatures, such as in cold climates or during winter, before being sprayed into the exhaust pipe. The reductant typically has a freezing point that may cause the reductant to at least partially transition from a liquid phase to a semi-solid (e.g., gel, etc.) phase when exposed to these cold temperatures. Accordingly, a mechanism is needed to heat the reductant in these applications. Some conventional engine systems provide this mechanism by routing another fluid (e.g., engine coolant, oil, heat transfer fluid, etc.) through a heat exchanger designed to heat the reductant. Other conventional engine systems utilize an electric heater designed to heat the reductant. However, each of these approaches requires additional energy input and decreases the overall efficiency of the engine system.

SUMMARY

In an embodiment, an aftertreatment system includes a reductant source, a junction, a dosing pump module, a valve assembly, and a dosing module. The reductant source stores reductant. The junction receives the reductant from the reductant source. The dosing pump module receives the reductant from the junction and selectively provides the reductant to a first conduit. The valve assembly receives the reductant from the first conduit. The valve assembly is operable between a first state, where the valve assembly provides the reductant to the junction, and a second state, where the valve assembly provides the reductant to a second conduit. The dosing module receives the reductant from the second conduit when provided by the valve assembly. The dosing module is configured to dose exhaust gases with the reductant when provided by the valve assembly.

In another embodiment, a dosing pump module includes an inlet, an outlet, an inlet chamber, a pump, and a heating mechanism. The inlet is configured to receive reductant from a reductant source. The outlet is configured to provide the reductant from the dosing pump module. The inlet chamber is configured to receive the reductant. The pump is configured to receive the reductant from the inlet chamber and to provide the reductant to the outlet. The heating mechanism is positioned proximate to the inlet chamber. The heating mechanism is configured to heat the reductant within the inlet chamber.

In another embodiment, a dosing pump module includes an inlet, an outlet, an inlet chamber, a heating mechanism, a chamber, a filter, and a cap. The inlet is configured to receive reductant from a reductant source. The outlet is configured to provide the reductant from the dosing pump module. The heating mechanism is positioned proximate to the inlet chamber. The heating mechanism is configured to heat the reductant within the inlet chamber. The chamber is configured to receive the reductant from the inlet. The filter is positioned within the chamber. The cap is configured to selectively encapsulate the chamber such that the filter is positioned within the chamber.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for heating reductant. The various concepts introduced above and discussed in greater detail below may be implemented in any of numerous ways, as the described concepts are not limited to any particular manner of implementation. Examples of specific implementations and applications are provided primarily for illustrative purposes.

I. Overview

Internal combustion engines (e.g., diesel internal combustion engines, etc.) produce exhaust gases that are often treated within an aftertreatment system. This treatment often includes treating (e.g., dosing, etc.) the exhaust gases with a reductant. The reductant is provided to the exhaust gases through the use of a pump. In some applications, such as when the internal combustion engine operates in a relatively cold environment, the reductant may tend to gel or solidify. It is important to remove gelled or solidified reductant prior to circulation through the reductant to the pump. Accordingly, the reductant needs to be heated in these applications. Conventionally, the reductant is heated by a heat exchanger or separate electric heater positioned to heat the reductant in a tank or along a reductant line. However, conventional approaches require costly components, the consumption of a relatively large amount of auxiliary energy, and are inefficient because the heated reductant is immediately transmitted into the exhaust gases.

Implementations described herein relate to a reductant delivery system that includes a dosing pump module that heats reductant within the dosing pump module and a valve assembly that selectively recirculates heated reductant upstream of the dosing pump module. The dosing pump module heats the reductant through the use of a heating mechanism that is controlled by a controller. The valve assembly is controlled by the controller to provide heated reductant from the dosing pump module to at least one of a location upstream of the dosing pump module and a dosing module for being provided to exhaust gases. In this way, the dosing pump module can be self-sustaining because the dosing pump module may not require any other mechanism for heating reductant other than the recirculated reductant which was previously heated by the dosing pump module.

The reductant delivery system described herein decreases costs compared to conventional systems because a heat exchanger or separate electrical heater is not utilized for heating the reductant or, if a heat exchanger or separate electrical heater is utilized, the auxiliary energy consumption thereof is significantly reduced compared to conventional systems. The reductant delivery system described herein is able to eliminate gelled or solidified reductant with the use of less, if any, of the auxiliary energy because of the selective recirculation of the heated reductant. Additionally, the incorporation of a heating mechanism directly within the dosing pump module simplifies the reductant delivery system compared to conventional systems. As a result, the reductant delivery system may be significantly less expensive than conventional systems.

II. Overview of Aftertreatment System

Figure 1:
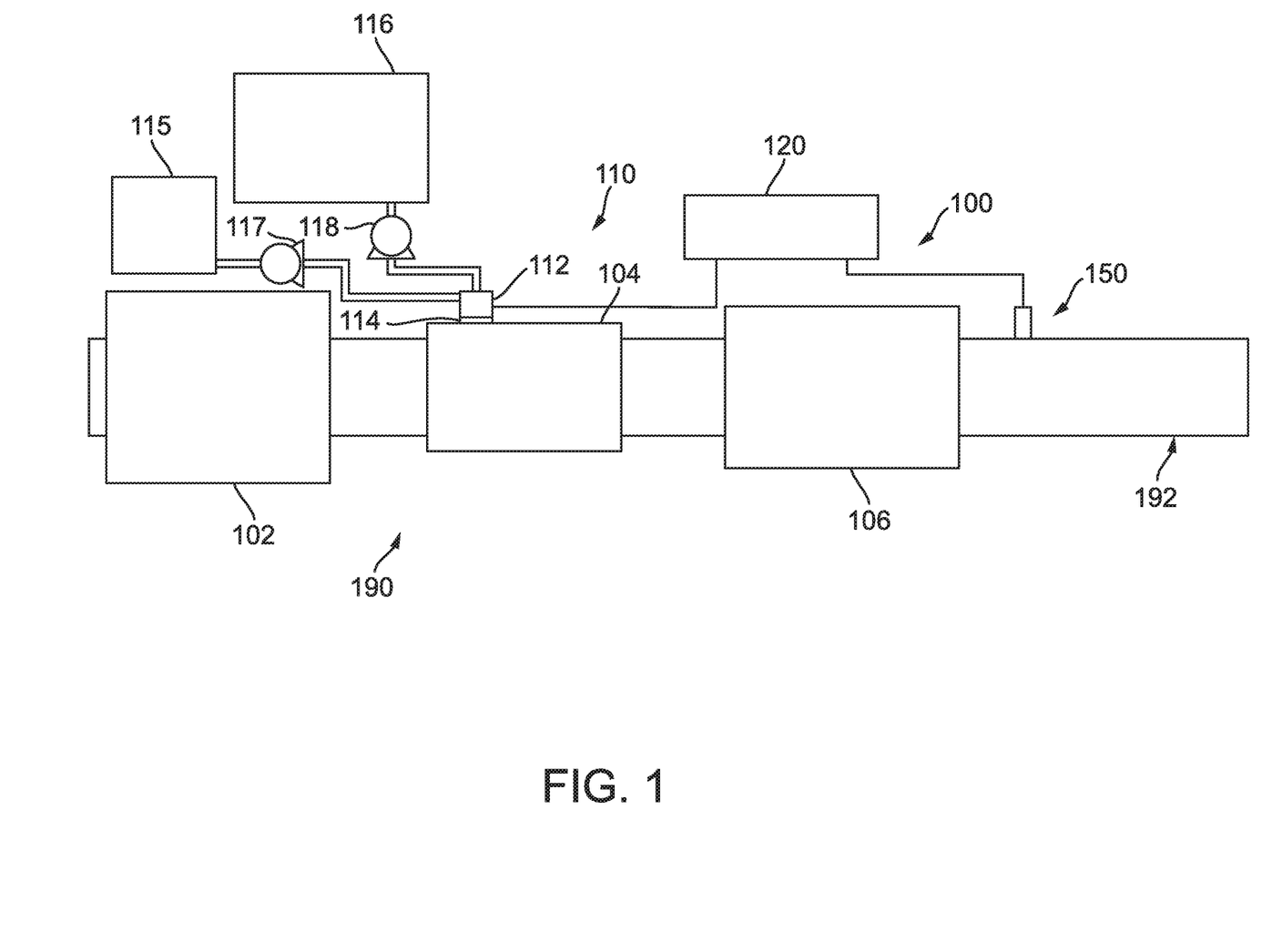
FIG. 1 is a block schematic diagram of an example aftertreatment system having an example reductant delivery system for an exhaust system.

FIG. 1 depicts an aftertreatment system 100 having an example reductant delivery system 110 for an exhaust system 190. The exhaust system 190 receives exhaust gases from an internal combustion engine (e.g., diesel internal combustion engine, etc.). The aftertreatment system 100 includes a particulate filter (e.g., a diesel particulate filter (DPF) 102), the reductant delivery system 110, a decomposition chamber 104 (e.g., reactor, etc.), and a SCR catalyst 106 (e.g., a chamber containing a catalyst). The aftertreatment system 100 may also include a sensor 150.

The DPF 102 is configured to remove particulate matter, such as soot, from exhaust gas flowing in the exhaust system 190. The DPF 102 includes an inlet, where the exhaust gas is received (e.g., from an engine manifold, etc.), and an outlet, where the exhaust gas exits after having particulate matter substantially filtered from the exhaust gas and/or converting the particulate matter into carbon dioxide. In some implementations, the DPF 102 may be omitted.

The decomposition chamber 104 is configured to convert a reductant, such as urea or DEF, into ammonia. The decomposition chamber 104 includes a reductant delivery system 110 having a dosing module 112 (e.g., doser, etc.) configured to dose the reductant into the decomposition chamber 104. In some implementations, the reductant is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing $NO_x$ emissions and an outlet for the exhaust gas, $NO_x$ emissions, ammonia, and/or reductant to flow to the SCR catalyst 106.

The decomposition chamber 104 includes the dosing module 112 mounted to the decomposition chamber 104 such that the dosing module 112 may dose the reductant into the exhaust gases flowing in the exhaust system 190. The dosing module 112 may include an insulator 114 interposed between a portion of the dosing module 112 and the portion of the decomposition chamber 104 on which the dosing module 112 is mounted. The dosing module 112 is fluidly coupled to one or more reductant sources 116 (e.g., tanks, vessels, etc.). In some implementations, a pump 118 may be used to pressurize the reductant from the reductant sources 116 for delivery to the dosing module 112.

The dosing module 112 is also fluidly coupled to one or more air sources 115. For example, the air sources 115 may be an air intake or air storage device (e.g., tank, etc.). A pump 117 (e.g., lift pump, etc.) is used to pressurize the air from the air sources 115 for delivery to the dosing module 112 (e.g., via pressurized conduits, etc.). The dosing module 112 mixes the air from the air sources 115 and the reductant from the reductant sources 116 and provides the air-reductant mixture into the decomposition chamber 104.

The dosing module 112, the pump 117, and the pump 118 are also electrically or communicatively coupled to a controller 120. The controller 120 is configured to control the dosing module 112 to dose the air-reductant mixture into the decomposition chamber 104. The controller 120 may also be configured to control the pump 117 and/or the pump 118. For example, the controller 120 may control the pump 117 and the pump 118 to obtain a target mixture of air and reductant that is provided to the decomposition chamber 104. In some implementations, the pump 117 and the air sources 115 may be omitted. In these implementations, the dosing module 112 does not receive pressurized air.

The controller 120 may include a microprocessor, an application-specific integrated circuit (ASIC), a field-programmable gate array (FPGA), etc., or combinations thereof. The controller 120 may include memory, which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), Erasable Programmable Read Only Memory (EPROM), flash memory, or any other suitable memory from which the controller 120 can read instructions. The instructions may include code from any suitable programming language.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes an inlet in fluid communication with the decomposition chamber 104 from which exhaust gas and reductant are received and an outlet in fluid communication with an end of the exhaust system 190.

The exhaust system 190 may further include an oxidation catalyst (for example a diesel oxidation catalyst (DOC)) in fluid communication with the exhaust system 190 (e.g., downstream of the SCR catalyst 106 or upstream of the DPF 102) to oxidize hydrocarbons and carbon monoxide in the exhaust gas.

In some implementations, the DPF 102 may be positioned downstream of the decomposition chamber 104. For instance, the DPF 102 and the SCR catalyst 106 may be combined into a single unit. In some implementations, the dosing module 112 may instead be positioned downstream of a turbocharger or upstream of a turbocharger.

The sensor 150 may be coupled to the exhaust system 190 to detect a condition of the exhaust gas flowing through the exhaust system 190. In some implementations, the sensor 150 may have a portion disposed within the exhaust system 190; for example, a tip of the sensor 150 may extend into a portion of the exhaust system 190. In other implementations, the sensor 150 may receive exhaust gas through another conduit, such as one or more sample pipes extending from the exhaust system 190. While the sensor 150 is depicted as positioned downstream of the SCR catalyst 106, it should be understood that the sensor 150 may be positioned at any other position of the exhaust system 190, including upstream of the DPF 102, within the DPF 102, between the DPF 102 and the decomposition chamber 104, within the decomposition chamber 104, between the decomposition chamber 104 and the SCR catalyst 106, within the SCR catalyst 106, or downstream of the SCR catalyst 106. In addition, two or more sensors 150 may be utilized for detecting a condition of the exhaust gas, such as two, three, four, five, or six sensors 150 with each sensor 150 located at one of the foregoing positions of the exhaust system 190. In some implementations, the sensors 150 may be omitted.

III. Example Dosing Pump Module

Figure 2:
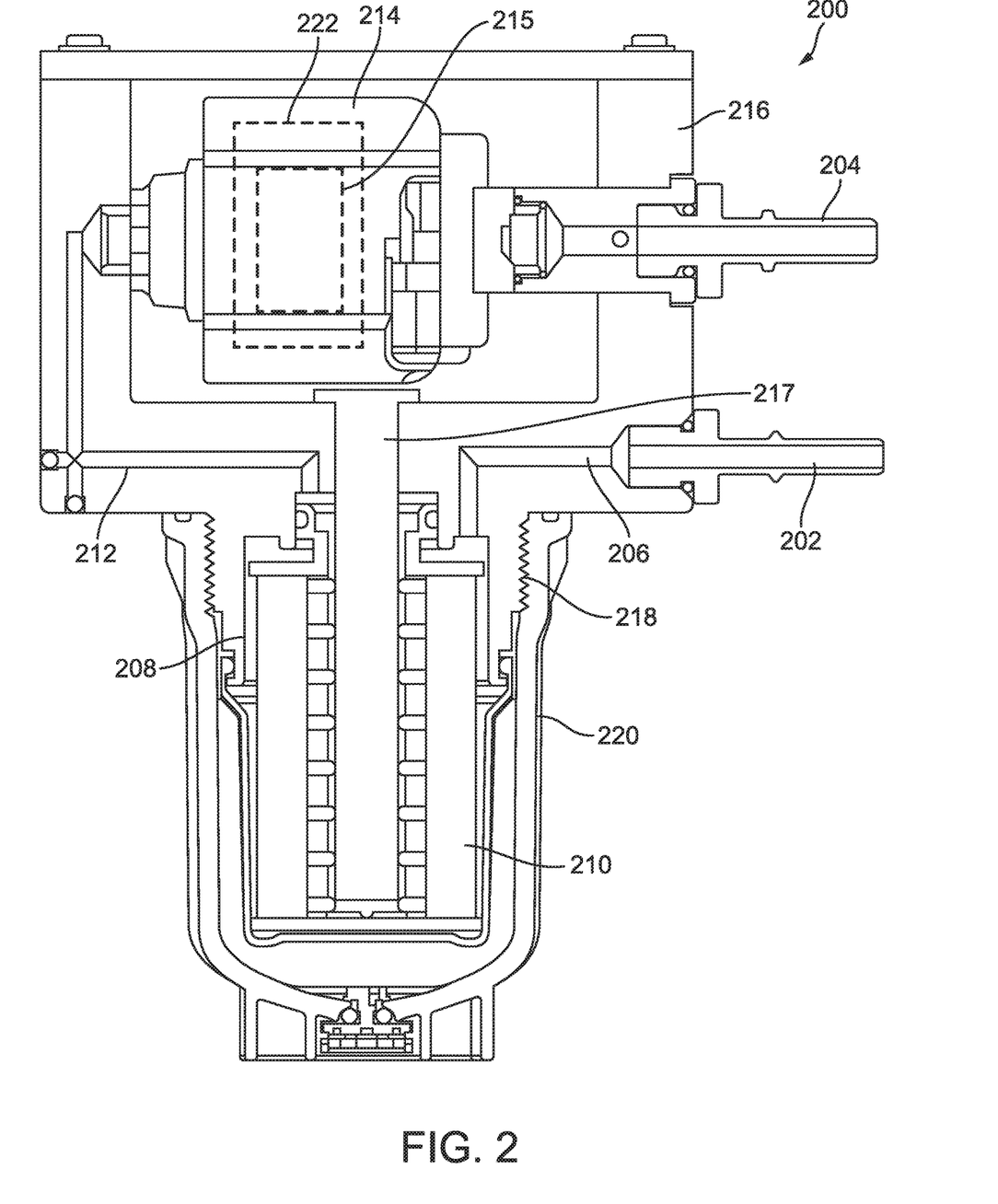
FIG. 2 is a cross-sectional view of an example dosing pump module for an aftertreatment system, such as the aftertreatment system shown in FIG. 1.

FIG. 2 depicts a dosing pump module 200 according to an example embodiment. The dosing pump module 200 receives reductant (e.g., DEF, urea, AdBlue®, etc.) from a source (e.g., tank, etc.) through an inlet 202 and provides the reductant into an exhaust conduit (e.g., exhaust pipe, etc.) for treating exhaust gases through an outlet 204.

The inlet 202 provides the reductant to a first channel 206 that provides the reductant into a chamber 208 having a filter 210. Within the chamber 208, the reductant is filtered (e.g., strained, etc.) by the filter 210. After being filtered, the reductant flows into a second channel 212 where the reductant is routed to a pump 214. The pump 214 includes an inlet chamber 215. Reductant collects within the inlet chamber 215 prior to being provided to a pumping mechanism (e.g., ram, turbine, screw drive, etc.) within the pump 214. The pump 214 then propels the reductant from the inlet chamber 215 through the outlet 204. The pump 214 may be a linear pump, a solenoid pump, or other similar pump.

The inlet 202 is in fluid communication with the first channel 206, which is in fluid communication with the chamber 208, which is in fluid communication with the second channel 212, which is in fluid communication with the pump 214, which is in fluid communication with the outlet 204. The pump 214 is operational between a first state (e.g., on, enabled, powered, operational, etc.), in which the pump 214 provides reductant to the outlet 204, and a second state (e.g., off, disabled, unpowered, non-operational, etc.), in which the pump 214 does not provide reductant to the outlet 204.

The dosing pump module 200 also includes a housing 216. The housing 216 contains the first channel 206, the second channel 212, and the pump 214. In various embodiments, the dosing pump module 200 also includes a filter mount 217. The filter mount 217 extends into the chamber 208. The filter 210 is mounted on the filter mount 217 such that the filter 210 is secured within the chamber 208. For example, the filter mount 217 may extend through a central aperture of the filter 210.

The first channel 206, the second channel 212, and the chamber 208 may be drilled into the housing 216. During assembly of the dosing pump module 200, the housing 216 may include a cavity into which the pump 214 is placed. This cavity may be filed with material (e.g., sealant, etc.) such that the pump 214 is fluidly sealed within the housing 216 from outside fluid. Prior to filling this cavity, a hole may be drilled from this cavity into the chamber 208. This hole may receive the filter mount 217. By filling the cavity and covering the pump 214, the filter mount 217 is secured within the housing 216.

The inlet 202 is coupled to the housing 216 such that a fluid-tight seal is created between the inlet 202 and the housing 216. The outlet 204 is also coupled to the housing 216 such that a fluid tight seal is created between the outlet 204 and the housing 216. The housing 216 includes a threaded portion 218 extending from the housing 216. The threaded portion 218 includes at least a portion of the chamber 208 positioned therein. The threaded portion 218 interfaces with a cap 220. The cap 220 provides access to the filter 210 such that the filter 210 can be, for example, replaced, cleaned, or otherwise serviced. The threaded interface between the cap 220 and the threaded portion 218 facilitates the formation of a fluid-tight seal therebetween. Further, the cap 220 may be configured such that the cap 220 can be removed without the use of tools (e.g., tool-less, etc.). For example, the cap 220 may be a "spin-on" cap.

The dosing pump module 200 may be installed in various applications such as vehicles (e.g., trucks, cars, commercial vehicles, construction vehicles, emergency vehicles, etc.), maritime vessels (e.g., ships, barges, boats, cruisers, etc.), and generators (e.g., standby generators, industrial generators, diesel generators, gensets, etc.). In an example application, the dosing pump module 200 is installed in a diesel vehicle that may be subject to various environmental (e.g., ambient, etc.) temperatures. For example, the diesel vehicle may operate in the summer and in the winter.

The dosing pump module 200 is designed to operate with the reductant being supplied to the dosing pump module 200 at various temperatures. When the reductant supplied to the dosing pump module 200 is cold, such as may occur when the dosing pump module 200 is operated in the winter, the reductant may tend to gel or otherwise solidify. For example, reductant may tend to gel at temperatures less than 262.15 degrees Kelvin (e.g., negative eleven degrees Celsius, etc.). It is undesirable to provide solidified or partially solidified reductant through the pump 214 to the outlet 204 because performance (e.g., efficiency, longevity, etc.) of the pump 214 may be negatively impacted. Therefore, the reductant should be heated (e.g., thawed, etc.) before the reductant can be provided through the pump 214 to the outlet 204.

In order to accommodate use of the dosing pump module 200 in cold weather where reductant may tend to solidify, the pump 214 incorporates a heating mechanism 222. The heating mechanism 222 functions to heat reductant within the inlet chamber 215 of the pump 214, regardless of whether the pump 214 is in the first state or the second state. In other words, the heating mechanism 222 may heat the reductant that collects within the inlet chamber 215 when the pump 214 is not providing the reductant to the outlet 204 (e.g., in the second state, etc.) and when the pump 214 is providing the reductant to the outlet 204 (e.g., in the first state, etc.). The heating mechanism 222 may include, for example, a series of resistance heating elements. The series of resistance heating elements may be positioned around the inlet chamber 215. The heating mechanism 222 may also include a heat exchanger that provides heat from a thermal transfer fluid to the reductant within the inlet chamber 215.

Conventional dosing systems may heat reductant a variety of ways. For example, conventional dosing systems may heat a reductant tank to cause the reductant therein to be heated. Conventional dosing systems may also cause the reductant to be heated through the use of a heat exchanger which passes heat from a hot fluid to the reductant. The hot fluid may be, for example, an engine coolant, lubricant, or dedicated thermal transfer fluid (e.g., within a dedicated thermal transfer loop circulating between a heat source and the heat exchanger, etc.). Conventional dosing systems may also utilize electric heaters that transform electrical energy (e.g., from a battery, from an alternator, etc.) into heat. However, conventional dosing systems do not heat the reductant directly within a pump.

In various embodiments, the dosing pump module 200 is implemented along with some conventional mechanisms for heating the reductant. In this way, the dosing pump module 200 may complement a conventional dosing system by directly heating the reductant within the dosing pump module 200 while the reductant supplied to the dosing pump module 200 is heated by the conventional dosing system. With this arrangement, both the conventional dosing system and the dosing pump module 200 share the task of heating the reductant. This may increase efficiency of the an internal combustion engine associated with the dosing pump module 200. The dosing pump module 200 selectively recirculates the reductant after it has been heated in order to utilize heat that would otherwise be wasted. Because conventional systems do not recirculate reductant, they are incapable of achieving the same efficiency and advantages of the dosing pump module 200.

IV. Example Aftertreatment System Including an Example Dosing Module

Figure 3:
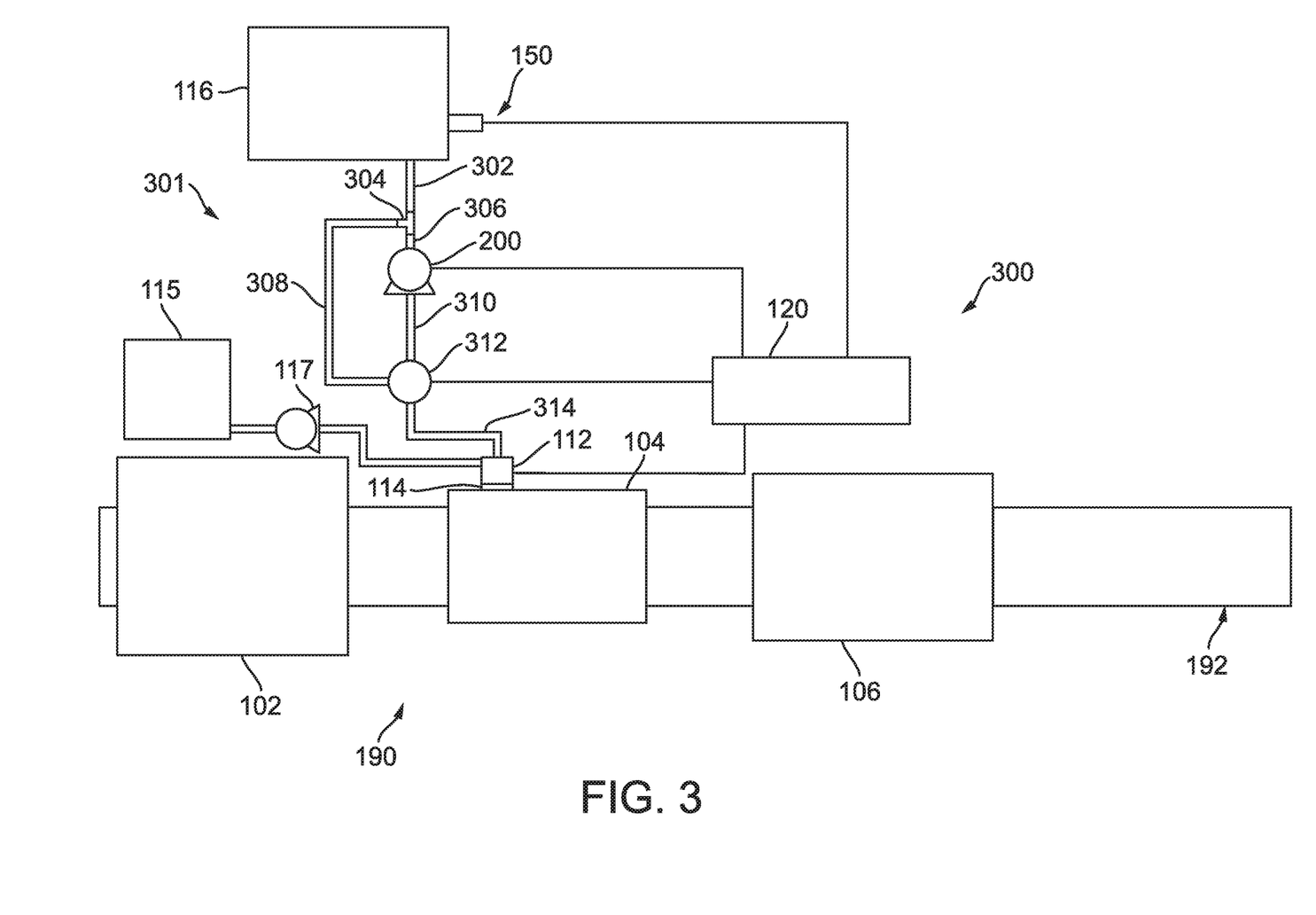
FIG. 3 is a block schematic diagram of another example aftertreatment system having an example reductant delivery system for an exhaust system.

FIG. 3 illustrates an aftertreatment system 300 including a reductant delivery system 301 having the dosing pump module 200. The aftertreatment system 300 includes some of the same components as the aftertreatment system 100 previously described, such as the reductant delivery system 301. Where the components are the same, their operation will not be repeated here.

The aftertreatment system 300 includes a first conduit 302 that provides reductant from the reductant sources 116 to a junction 304. The junction 304 is fluidly communicable with the first conduit 302, a second conduit 306, and a third conduit 308. The junction 304 facilitates the exchange of fluid between any of the first conduit 302, the second conduit 306, and the third conduit 308. In some embodiments, the third conduit 308 incorporates a check valve positioned proximate to the junction 304. This check valve is configured to (e.g., structured to, etc.) prevent the flow of reductant from the first conduit 302 into the third conduit 308.

The second conduit 306 provides the reductant to the dosing pump module 200. The dosing pump module 200 selectively provides the reductant to a fourth conduit 310. A valve assembly 312 receives the reductant from the fourth conduit 310 and selectively provides the reductant to a fifth conduit 314 and/or the third conduit 308. The fifth conduit 314 selectively provides the reductant to the dosing module 112 which provides the reductant to the decomposition chamber 104.

The valve assembly 312 includes a controllable valve and a check valve (e.g., no-return valve, etc.). The controllable valve included within the valve assembly 312 may be, for example, an orifice valve, a ball valve (e.g., electronically controllable ball valve, etc.), a bimetallic valve, a solenoid valve, and other similar valves. The check valve included within the valve assembly 312 functions to prevent backflow of the reductant into the fourth conduit 310, such as from the third conduit 308 or the fifth conduit 314.

The valve assembly 312 is operable between a first state (e.g., full recirculation state, mode, setting, etc.), where the valve assembly 312 provides the reductant to only the third conduit 308, a second state (e.g., full dosing state, mode, setting, etc.), where the valve assembly 312 provides the reductant to only the fifth conduit 314, and a third state (e.g., partial recirculation state, mode, setting, etc.), where the valve assembly 312 provides the reductant to both the third conduit 308 and the fifth conduit 314. The dosing pump module 200 functions to increase the temperature of the reductant from a first temperature (e.g., two-hundred and seventy-three degrees Kelvin, zero degrees Celsius, etc.) within the second conduit 306 to a second temperature (e.g., two-hundred and seventy-eight degrees Kelvin, five degrees Celsius, etc.), greater than the first temperature, within the fourth conduit 310.

When the reductant is provided by the valve assembly 312 to the third conduit 308, the reductant is recirculated to the junction 304 where it is combined with the reductant from the reductant sources 116. This combination of the reductant causes an increase in temperature of the reductant provided from the reductant sources 116 because the reductant provided from the third conduit 308 had been previously heated within the dosing pump module 200 by the heating mechanism 222. The reductant provided from the third conduit 308 has a first temperature (e.g., two-hundred and seventy-eight degrees Kelvin, five degrees Celsius, etc.), the reductant within the first conduit 302, which is provided to the junction 304, has a second temperature (e.g., two-hundred and seventy-three degrees Kelvin, zero degrees Celsius, etc.), less than first temperature, and the reductant within the second conduit 306, which is provided to the dosing pump module 200, has a third temperature (e.g., two-hundred and seventy-six degrees Kelvin, three degrees Celsius, etc.), greater than the second temperature and less than the first temperature.

When the valve assembly 312 is in the third state, a first portion of the reductant is provided to the third conduit 308, for recirculation to the junction 304 thereby causing heating of the reductant from the reductant sources 116, and a second portion (e.g., remaining portion, etc.) of the reductant is provided to the fifth conduit 314, for use by the dosing module 112 (e.g., to dose the decomposition chamber 104, etc.). The ratio of the first portion of the reductant to the second portion of the reductant is directly related to the difference in temperature between the temperature of the reductant within the first conduit 302 to the temperature of the reductant within the second conduit 306. For example, the greater the ratio of the first portion of the reductant to the second portion of the reductant (e.g., more of the reductant is provided to the third conduit 308 than to the fifth conduit 314, etc.), the greater the increase in temperature between the temperature of the reductant within the first conduit 302 to the temperature of the reductant within the second conduit 306.

Another factor directly related to the difference in temperature between the temperature of the reductant within the first conduit 302 to the temperature of the reductant within the second conduit 306 is the amount of heating provided by the heating mechanism 222 to the reductant within the inlet chamber 215. The amount of heating provided by the heating mechanism 222 may be selected based on a temperature of the reductant at a location such as within the inlet chamber 215, within the first conduit 302, within the junction 304, within the second conduit 306, and within the reductant sources 116. The temperature of the reductant may be determined by a sensor, such as the sensor 150 which is shown in FIG. 3 as measuring the temperature of the reductant within the reductant sources 116. The controller 120 may compare the temperature from the sensor 150 to a target temperature to determine the amount of heating to be provided by the heating mechanism 122. The target temperature may be based on requirements of the dosing pump module 200, characteristics (e.g., brand, composition, etc.) of the reductant, and operating conditions of an internal combustion engine associated with the aftertreatment system 300, and other similar conditions.

Figure 4:
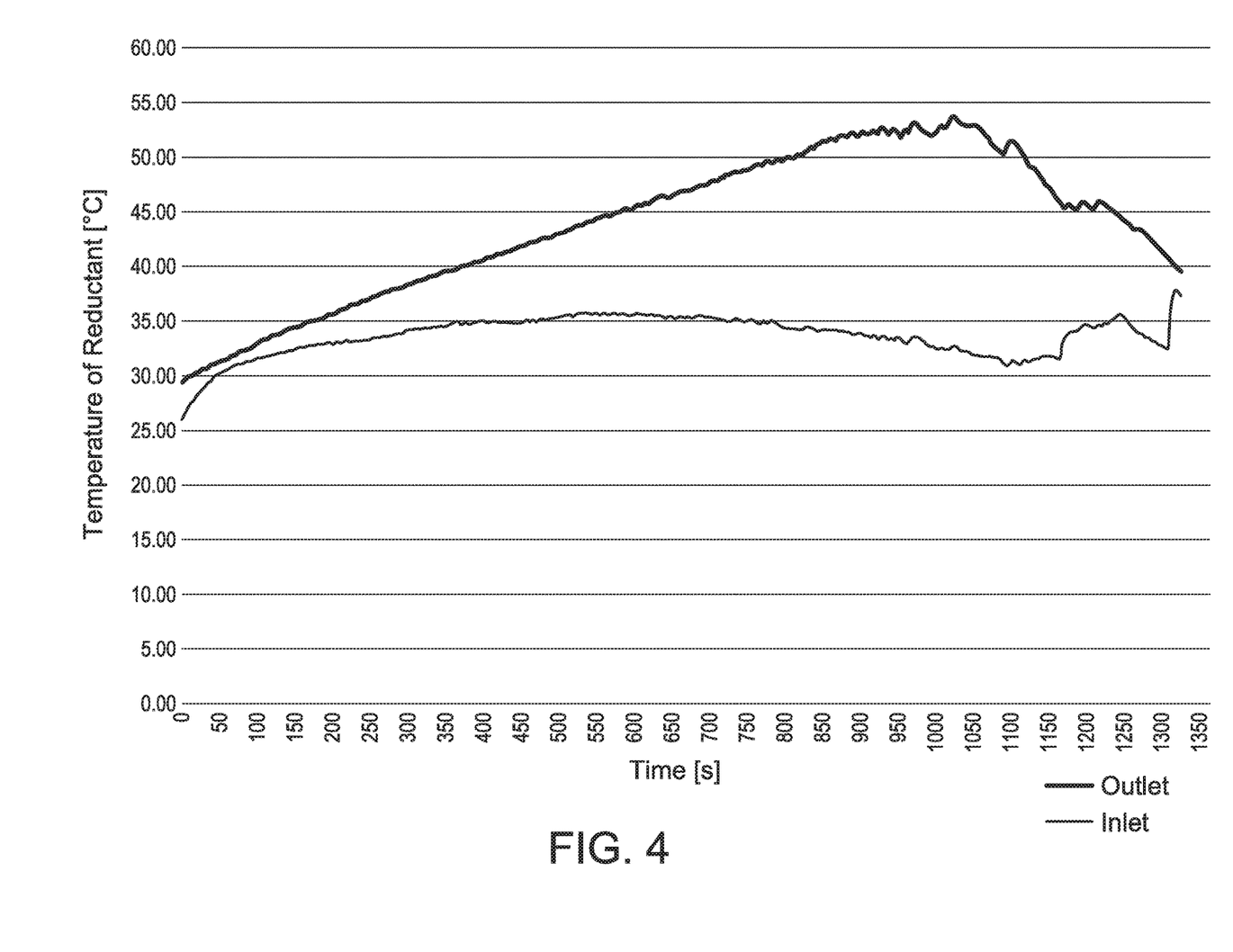
FIG. 4 is a plot of reductant temperatures at an inlet and an outlet of an example dosing pump module.

FIG. 4 illustrates a difference between the temperature of the reductant within the fourth conduit 310 (labeled as "Outlet") and the temperature of the reductant within the second conduit 306 (labeled as "Inlet"). The amount of heating provided by the heating mechanism 222 is directly related to the difference between the two temperatures shown in FIG. 4 for each instance in time.

In addition to the dosing module 112 and the sensor 150, the controller 120 is communicatively coupled to the dosing pump module 200 and the valve assembly 312. With regard to the dosing pump module 200, the controller 120 is communicatively coupled to the pump 214 and the heating mechanism 222. The controller 120 may, for example, control a speed of the pump 214 (e.g., to produce a target flow rate of the reductant into the fourth conduit 310, etc.) and control an amount of heating provided by the heating mechanism 222 (e.g., by controlling an amount of electrical energy provided to the heating mechanism 222, etc.). By controlling the speed of the pump 214, the controller 120 can increase heat transfer between the reductant from the third conduit 308 to the reductant from the first conduit 302 as well as between the heating mechanism 222 and the reductant within the inlet chamber 215. With regard to the valve assembly 312, the controller 120 may, for example, control a state of the valve assembly 312 thereby dictating an amount of the reductant, if any, that is provided to the third conduit 308 and the fifth conduit 314. Specifically, the controller 120 may control a position of an electronically controllable valve within the valve assembly 312.

In an example operation, the controller 120 receives sensor data from the sensor 150, the sensor data related to the temperature of the reductant at a location within the reductant delivery system 301. The controller 120 then compares the temperature to a threshold to determine if the temperature is less than the threshold. If the controller 120 determines that the temperature is less than the threshold, the controller 120 determines that the reductant needs to be heated.

The controller 120 is capable of heating (e.g., configured to heat, structured to heat, etc.) the reductant by varying the amount of heating provided by the heating mechanism 222, by controlling the valve assembly 312 to vary the ratio of the portion of the reductant provided to the third conduit 308 to the portion of the reductant provided to the fifth conduit 314, and by controlling a speed of the pump 214.

Depending on the operating condition (e.g., non-operational, pre-start, start-up, idle, high-load, cooldown, etc.) of an internal combustion engine associated with the aftertreatment system 300, the controller 120 may provide heating to the reductant in different ways. The threshold temperature, against which the controller 120 compares the temperature determined from the sensor data from the sensor 105, may be different depending on the operating condition of the internal combustion engine associated with the aftertreatment system 300.

V. Example Operation of a Reductant Delivery System Including the Dosing Pump Module The following is a simplified overview of several example operations of the reductant delivery system 301 including the dosing pump module 200 and other components of the aftertreatment system 300. These examples are not limiting in nature or scope and are provided for explanation only. In these examples, the reductant within the reductant sources 116 is relatively cold, and therefore tends to gel or solidify. Depending on the operating condition of the internal combustion engine, the reductant delivery system 301 functions differently to ensure that reductant is provided to the dosing module 112 when necessary and to ensure that the pump 214 is not negatively impacted by the reductant.

In the non-operational mode, the internal combustion engine is not running and therefore reductant does not need to be provided to the dosing module 112. Therefore, the controller 120 may control the valve assembly 312 such that all of the reductant is provided to the third conduit 308. The threshold may be relatively low because the reductant may only need to be only heated enough to ensure that the pump 214 is not negatively impacted by the reductant. The heating mechanism 222 may only be required to provide a relatively small amount of heat to the reductant within the inlet chamber 215. The speed of the pump 214, as controlled by the controller 120, may be relatively low because reductant does not need to be provided to the dosing module 112. For example, the speed of the pump 214 may be selected to be sufficient such that the reductant does not tend to gel outside of the dosing pump module 200, such as within the third conduit 308 or the first conduit 302.

In the pre-start mode, the internal combustion engine is not running and therefore reductant does not need to be provided to the dosing module 112. Therefore, the controller 120 may control the valve assembly 312 such that all of the reductant is provided to the third conduit 308. The pre-start mode may be initiated when operation of the internal combustion engine is imminent, such as when an operator initiates a start-up sequence. Therefore, while reductant is not currently being provided to the dosing module 112, the reductant delivery system 301 has to immediately prepare for providing the reductant to the dosing module 112. The threshold may be higher than for the non-operational mode because the reductant will soon need to be circulated to the dosing module 112. The heating mechanism 222 may be required to provide more heat to the reductant within the inlet chamber 215 than provided in the non-operational mode. The speed of the pump 214, as controlled by the controller 120, may be greater than in the non-operational mode because reductant will soon be provided to the dosing module 112.

In the start-up mode, the internal combustion engine is running and therefore some reductant needs to be provided to the dosing module 112. However, the reductant entering the dosing pump module 200 also needs to be heated. Therefore, the controller 120 may control the valve assembly 312 such that a smaller portion (e.g., fifteen percent, etc.) of the reductant is provided to the fifth conduit 314 and a larger portion (e.g., eighty-five percent, etc.) of the reductant is provided to the third conduit 308. The start-up mode may be initiated when an operator turns a key. The threshold may be higher than for the pre-start mode because increasing the fluidity of the reductant (e.g., reducing or eliminating any gelling within the reductant, etc.) is important. The heating mechanism 222 may be required to provide more heat to the reductant within the inlet chamber 215 than provided in the pre-start mode. The speed of the pump 214, as controlled by the controller 120, may be greater than in the pre-start mode because the reductant is being provided to the dosing module 112.

In the idle mode, the internal combustion engine is running and therefore some reductant needs to be provided to the dosing module 112. However, the reductant entering the dosing pump module 200 may also need to be heated. Therefore, the controller 120 may control the valve assembly 312 such that a larger portion (e.g., sixty-five percent, etc.) of the reductant is provided to the fifth conduit 314 and a smaller portion (e.g., thirty-five percent, etc.) of the reductant is provided to the third conduit 308. The idle mode may be initiated when the internal combustion engine is running under a no-load condition. The threshold may be lower than for the start-up mode because increasing the fluidity of the reductant (e.g., reducing or eliminating any gelling within the reductant, etc.) is important. The heating mechanism 222 may be required to provide less heat to the reductant within the inlet chamber 215 than provided in the start-up mode. The speed of the pump 214, as controlled by the controller 120, may be less than in the pre-start mode because less exhaust gases are provided from the internal combustion engine in the idle mode than in the start-up mode.

In the high-load mode, the internal combustion engine is running and therefore some reductant needs to be provided to the dosing module 112. However, the reductant entering the dosing pump module 200 may also need to be heated. Therefore, the controller 120 may control the valve assembly 312 such that a larger portion (e.g., ninety percent, etc.) of the reductant is provided to the fifth conduit 314 and a smaller portion (e.g., ten percent, etc.) of the reductant is provided to the third conduit 308. In some applications, the controller 120 may control the valve assembly 312 such that all of the reductant is provided to the fifth conduit 314 and none of the reductant is provided to the third conduit 308. The high-load mode may be initiated when the internal combustion engine is running under a high-load condition, such as when operating near maximum speed or power. The threshold may be lower than for the start-up mode because increasing the fluidity of the reductant (e.g., reducing or eliminating any gelling within the reductant, etc.) is important. The heating mechanism 222 may be required to provide less heat to the reductant within the inlet chamber 215 than provided in the start-up mode. The speed of the pump 214, as controlled by the controller 120, may be greater than in the idle mode because more exhaust gases are provided from the internal combustion engine in the high-load mode than in the idle mode.

In the cooldown mode, the internal combustion engine is running and therefore some reductant needs to be provided to the dosing module 112. However, the reductant entering the dosing pump module 200 may also need to be heated. Therefore, the controller 120 may control the valve assembly 312 such that a larger portion (e.g., fifty-five percent, etc.) of the reductant is provided to the fifth conduit 314 and a smaller portion (e.g., forty-five percent, etc.) of the reductant is provided to the third conduit 308. The cooldown mode may be initiated when shutdown of the internal combustion engine is imminent, such as when an operator turns off the internal combustion engine. The portion of the reductant that is provided to the fifth conduit 314 may be greater for the cooldown mode than for the high-load mode because increasing the fluidity of the reductant (e.g., reducing or eliminating any gelling within the reductant, etc.) is less important. The heating mechanism 222 may be required to provide less heat to the reductant within the inlet chamber 215 than provided in the start-up mode. The speed of the pump 214, as controlled by the controller 120, may be less than in the high-load mode because less exhaust gasses are provided from the internal combustion engine in the cooldown mode than in the high-load mode.

TABLE 1

Characteristics of the Reductant Delivery System for Various Operational Modes of an Internal Combustion Engine Associated with the Reductant Delivery System.

| Operational Mode | Heating Provided by the Heating Mechanism 222 | Speed of the Pump 214 | Ratio of the Portion of the Reductant Provided to the Third Conduit 308 to the Portion of the Reductant Provided to the Fifth Conduit 314 |
|---|---|---|---|
| Non-operational | Low | Low | All the reductant is provided to the third conduit 308 |
| Pre-start | Medium | Medium | All the reductant is provided to the third conduit 308 |
| Start-up | High | High | High |
| Idle | Medium | Medium | Medium |
| High-load | Medium | High | Low; or all of the reductant is provided to the fifth conduit 314 |
| Cooldown | Low | Medium | Medium |

VI. Construction of Example Embodiments

In addition to the example reductant delivery system shown in FIG. 3, it is understood that various modifications are possible. For example, conventional heat exchangers (e.g., engine coolant heat exchangers, engine oil heat exchangers, etc.) or electrical heaters may be incorporated at various positions within the reductant delivery system to compliment the heating mechanism 222 in heating the reductant. These complimentary heat sources may be communicatively coupled to the controller 120 and controlled thereby. For example, an electrical heater may be positioned along the first conduit 302 that provides heat to the reductant therein. This electrical heater may be controlled to provide varying amounts of heat to the reductant depending on an operating condition of the internal combustion engine.

While not shown, the junction 304 may be configured to facilitate mixing and maximize transfer of heat to the reductant from the first conduit 302. For example, the junction 304 may incorporate a mixing device (e.g., perforated plate, coalescing device, turbine, etc.) designed to intermix the reductant from the third conduit 308 with the reductant from the first conduit 302.

While not shown, it is understood that the dosing pump module 200 may be implemented in various systems similar to the aftertreatment system 300. For example, the dosing pump module 200 may be implemented in a fuel delivery system that provides fuel (e.g., diesel fuel, etc.) to an internal combustion engine. In a fuel delivery system, the dosing pump module 200 may function to prevent gelling or other solidification of the fuel provided to a fuel injector. Other systems, such as turbocharged systems, liquid filtration systems, exhaust gas recirculation systems, hydraulic systems, and other similar systems may also implement the dosing pump module 200 in a similar capacity to those described herein.

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two components directly or indirectly to one another. Such joining may be stationary (e.g., permanent) or movable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled," "in fluid communication," and the like, as used herein, mean the two components or objects have a pathway formed between the two components or objects in which a fluid (e.g., exhaust, water, air, gaseous reductant, gaseous ammonia, etc.) may flow, either with or without intervening components or objects. Examples of fluid couplings or configurations for enabling fluid communication may include piping, channels, or any other suitable components for enabling the flow of a fluid from one component or object to another. As described herein, "preventing" gelling of reductant should be interpreted as potentially allowing for de minimus gelling (e.g., less than one percent, etc.) of reductant.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language "a portion" is used, the item can include a portion and/or the entire item, unless specifically stated to the contrary.

What is claimed is:

1. An aftertreatment system comprising:
   a reductant source configured to store reductant;
   a junction configured to receive the reductant from the reductant source;
   a dosing pump module configured to receive the reductant from the junction and to selectively provide the reductant to a first conduit;
   a valve assembly configured to receive the reductant from the first conduit, the valve assembly being operable between a first state, in which the valve assembly provides the reductant to the junction, and a second state, in which the valve assembly provides the reductant to a second conduit; and
   a dosing module configured to receive the reductant from the second conduit when provided by the valve assembly, the dosing module being configured to dose exhaust gasses with the reductant when provided by the valve assembly.

2. The aftertreatment system of claim 1, wherein the dosing pump module comprises:
   an inlet chamber configured to receive the reductant from the junction;
   a pump configured to receive the reductant from the inlet chamber and provide the reductant to the first conduit; and
   a heating mechanism positioned proximate to the inlet chamber, the heating mechanism being configured to heat the reductant within the inlet chamber.

3. The aftertreatment system of claim 2, wherein the heating mechanism is configured to heat the reductant within the inlet chamber while the valve assembly is in the first state.

4. The aftertreatment system of claim 3, wherein the valve assembly provides the reductant to only the junction in the first state.

5. The aftertreatment system of claim 2, wherein the heating mechanism is contained within the pump.

6. The aftertreatment system of claim 2, further comprising:
   a sensor configured to determine a temperature of the reductant within the reductant source;
   a controller communicable with the sensor, the pump, and the heating mechanism;
   wherein the controller is configured to control at least one of a temperature of the heating mechanism and a speed of the pump based on the temperature of the reductant determined by the sensor.

7. The aftertreatment system of claim 6, wherein the controller is configured to control the speed of the pump based on the temperature of the reductant determined by the sensor and the temperature of the heating mechanism.

8. The aftertreatment system of claim 6, wherein the controller is configured to control the temperature of the heating mechanism based on the temperature of the reductant determined by the sensor and the speed of the pump.

9. The aftertreatment system of claim 2, wherein the dosing pump module further comprises:
a chamber;
a filter positioned within the chamber; and
a cap configured to selectively encapsulate the chamber such that the filter is positioned within the chamber.

10. The aftertreatment system of claim 9, wherein the dosing pump module further comprises:
an inlet configured to receive the reductant from the reductant source;
a first channel configured to receive the reductant from the inlet and to provide the reductant to the chamber;
a second channel configured to receive the reductant from the filter and to provide the reductant to the pump; and
an outlet configured to receive the reductant from the pump.

11. The aftertreatment system of claim 2, wherein the heating mechanism comprises a series of resistance heating elements.

12. The aftertreatment system of claim 1, wherein the valve assembly is additionally operable in a third state, in which the valve assembly provides the reductant to both the junction and the dosing module simultaneously.

13. The aftertreatment system of claim 1, further comprising:
an air source; and
an air pump configured to receive air from the air source and to provide air to the dosing module;
wherein the dosing pump module is configured to mix the air and the reductant when dosing the exhaust gasses with the reductant when provided by the valve assembly.

14. A dosing pump module comprising:
an inlet configured to receive reductant from a reductant source;
an outlet configured to provide the reductant from the dosing pump module;
a pump configured to provide the reductant to the outlet, the pump comprising an inlet chamber that is configured to receive the reductant; and
a heating mechanism positioned proximate to the inlet chamber, the heating mechanism configured to heat the reductant within the inlet chamber.

15. The dosing pump module of claim 14, further comprising:
a chamber;
a filter positioned within the chamber; and
a cap configured to selectively encapsulate the chamber such that the filter is positioned within the chamber.

16. The dosing pump module of claim 15, further comprising:
a first channel configured to receive the reductant from the inlet and to provide the reductant to the chamber; and
a second channel configured to receive the reductant from the filter and to provide the reductant to the inlet chamber.

17. The dosing pump module of claim 14, wherein the heating mechanism comprises a plurality of resistance heating elements.

18. A dosing pump module comprising:
an inlet configured to receive reductant from a reductant source;
an outlet configured to provide the reductant from the dosing pump module;
a pump comprising an inlet chamber;
a heating mechanism positioned proximate to the inlet chamber, the heating mechanism configured to heat the reductant within the inlet chamber;
a chamber configured to receive the reductant from the inlet;
a filter positioned within the chamber; and
a cap configured to selectively encapsulate the chamber such that the filter is positioned within the chamber.

19. The dosing pump module of claim 18, further comprising:
a first channel configured to receive the reductant from the inlet and to provide the reductant to the chamber; and
a second channel configured to receive the reductant from the filter and to provide the reductant to the inlet chamber.

20. The dosing pump module of claim 18, wherein the heating mechanism is disposed at least partially around the inlet chamber.

* * * * *